Patented July 8, 1924.

1,500,985

UNITED STATES PATENT OFFICE.

RICHARD DEUTSCHMANN AND WILHELM KOTZENBERG, OF HAMBURG, GERMANY.

METHOD FOR PRODUCING ANTITOXINS.

No Drawing. Application filed August 6, 1923. Serial No. 656,134.

*To all whom it may concern:*

Be it known that we, Professor Dr. RICHARD DEUTSCHMANN, a citizen of Germany, and residing at Hamburg, Alsterkan.p 19, and Professor Dr. WILHELM KOTZENBERG, a citizen of Germany, and residing at Hamburg, Magdalenenstrasse 6, Germany, have invented new and useful Methods for Producing Antitoxins (for which a patent application has been filed in Germany on May 8, 1922), and of which the following is a specification.

The present invention refers to a method for producing antitoxins particularly for treating cancer and the like.

In carrying out the invention animals are treated with germ cell substances. The methods known heretofore for producing antitoxic sera generally culminated therein that the animals were inoculated with living or dead cultures of bacterii or with the poisons of such pathogenes against which the serum to be gained serves as an antitoxin. When it could be assumed that the animals had gathered in their blood a sufficient amount of counter-poison, blood was taken from them, and from it the serum, that is effective against the disease in question, was produced.

Contrary to these known methods the new method is characterized therein that the animals are not infected by pathogenes or products from such, but germ cell substance, either such from ovarium or from the testicles or from both mixed to a prescribed proportion is introduced hypodermically or inoculated parenterally, that is to say anywhere exterior to the normal digestive canals. The nature of the animal fights against such foreign substances forced into it by forming antidotes, which after a certain time accumulate in the blood to such a concentration that the serum gained therefrom is rendered curative against abnormal excrescences or malignant tumor of the cells for instance cancer in the human organism.

By way of example the method can be carried out as follows:

A suitable animal, for instance a horse, will be inoculated by a mixture of ovarium- and testicle-juice in a certain proportion of mixture to be regulated according to the size and the weight of the horse. There is no limitation with regard to whether the antigenic substances are taken from animals of the same species as the animal inoculated or not, nor need they be of cross species or genera of any similar kind. Lively action takes place within the animal, even fever and other symptoms of illness arise. When the latter has faded away a new inoculation can be carried out again in properly regulated proportion of mixture, and when the reaction of this again has faded further inoculations can be performed carefully controlling the temperature and the other behaviour of the animal until it must be assumed that about the maximum of concentration of antidotes against the germ cells in the blood is arrived at. Then the animal will be in a state suitable for producing the required serum.

A second example for producing such antitoxin is as follows:

Instead of forcing into the animal ovarium and testicle substance mixed by hand, it might be taken from naturally mixed cells for instance cell substance from freshly fructified ova (oosperm) or even going further minute animal embryons may be used for producing the substance which is inoculated into the animals chosen for the products of the curative serum. The operation with such mixture serum is carried on in the same manner as if germ cell substances and testicles were inoculated (fresh).

As to the effect of the two different kinds of germ cells singly or in combination the following is to be remarked:

It has been found out by the inventors that when the patient is to be treated with serum for the purpose of curing cancer, which serum is gained by the inoculation of ovarium from the inoculated animal the cancer was affected in this way that a decomposition and a liquefaction set in. If, however, a serum is used which has been gained by inoculating testicle substance the effect is the reverse, that is to say, the cancer dries up and its growth is discontinued (encapsulation).

For effectively overcoming malignant growths, such as cancer or a cancerous tumor it is of great importance to avail oneself of both manners of operation simultaneously. Therefore it is of advantage to produce a serum, which has the property of that of ovarium serum as well as of testicle serum. Taking this into consideration the manner of carrying out the invention may be as follows:

According to the weight of the animal, by which it is intended to produce the serum, the prescribed mixture of ovarium-substance and testicle substance is produced for instance in the proportion of 1:4, which in accurately determined amounts is introduced into the animal during the run of several weeks according to the reaction testified. When it has been found that the blood of the animal has adopted such concentration of mixed antigenes that a curative serum can be gained therefrom, the blood is drawn off and worked into serum in usual manner.

We claim:

1. A method for producing an antitoxic serum, comprising inoculating ovarium substance and testicle substance into the organism of an animal, and gaining the serum from the blood of the thus inoculated animal.

2. A method for producing an antitoxic serum, comprising inoculating a mixture of one part of substance of ovarium and four parts of substance from testicles into the organism of an animal and gaining the serum from the blood of the thus inoculated animal.

Prof. Dr. RICHARD DEUTSCHMANN.
Prof. Dr. WILHELM KOTZENBERG.